US005523165A

United States Patent [19]
Walter et al.

[11] Patent Number: 5,523,165
[45] Date of Patent: Jun. 4, 1996

[54] COMPONENT WITH PROTECTIVE ARRANGEMENT TO PREVENT ALUMINIZING OR CHROMIZING DURING GAS DIFFUSION COATING

[75] Inventors: Heinrich Walter, Derching; Horst Pillhöfer, Röhrmoos; Michael Strasser, Kleinberghofen; Frank Brungs, Dachau; Ralph Kropp, München; Martin Schaipp, Junkenhofen, all of Germany

[73] Assignee: MTU Motoren-Und Turbinen Union, GmbH, Munich, Germany

[21] Appl. No.: 363,225

[22] Filed: Dec. 23, 1994

[30] Foreign Application Priority Data

Dec. 23, 1993 [DE] Germany .................. 43 44 061.4

[51] Int. Cl.⁶ .................................................. B32B 15/04
[52] U.S. Cl. ...................... 428/469; 428/472; 428/699; 428/701; 428/702; 427/282
[58] Field of Search .................................. 427/237, 239, 427/253, 282; 264/86, 87; 428/546, 551, 553, 558, 457, 469, 472, 699, 701, 702; 118/720, 721; 148/213, 214

[56] References Cited

U.S. PATENT DOCUMENTS

| 4,181,758 | 1/1980 | Elam | 427/253 |
| 4,208,453 | 6/1980 | Baldi | 427/237 |
| 4,464,430 | 8/1984 | Baldi | 428/201 |
| 4,467,016 | 8/1984 | Baldi | 428/595 |

FOREIGN PATENT DOCUMENTS 2008621  6/1979  United Kingdom .

OTHER PUBLICATIONS

Superalloys II, Sims, et al., John Wiley and Sons, Inc., 1987, p. 580.

*Primary Examiner*—Ellis P. Robinson
*Assistant Examiner*—Leonidas J. Jones, III
*Attorney, Agent, or Firm*—Evenson, McKeown, Edwards & Lenahan

[57] ABSTRACT

This invention relates to a component of an iron, cobalt or nickel-base alloy with a protective arrangement to prevent aluminizing or chromizing during gas diffusion coating, with a first layer as an interlayer and a second layer as a getter layer for reaction gases, where the first layer is a slip casting layer composed of oxide ceramic particles carried in a low-carbon vehicle free from halide, and the second layer is a metal layer or a metallic slip casting layer. The metal layer contains at least 50% by weight of the base-metal fraction of the component and exhibits all major alloy constituents of the component. The metal layer may be a sintered metal shape.

6 Claims, 2 Drawing Sheets

COMPONENT WITH PROTECTIVE ARRANGEMENT TO PREVENT ALUMINIZING OR CHROMIZING DURING GAS DIFFUSION COATING

BACKGROUND AND SUMMARY OF THE INVENTION

This invention relates to a component of an iron, cobalt or nickel-base alloy having a protective arrangement to prevent aluminizing or chromizing during gas diffusion coating that includes a first layer serving as an interlayer and a second layer serving as a getter layer for reaction gases.

When producing protective coatings, such as aluminum or chrome diffusion coatings, by means of the powder packing method in accordance with U.S. Pat. No. 3,079,276 or U.S. Pat. No. 3,801,353 or by means of the vapor phase deposition method in accordance with U.S. Pat. No. 4,132,816 or German Patent Document DE 38 05 370, it has proved difficult to protect component sections from aluminizing or chromizing that should not be exposed to the coating atmosphere. In conventional protective arrangements the first layer consists of a fill of $Al_2O_3$ particles and a getter layer consisting of a metal-metal oxide powder blend. Such powder fills are commercially available.

At coating temperatures above 900° C. it is especially difficult to ensure high absorption capacity of the conventional protective arrangement for the elements to be deposited and for the aggressive halide-containing reaction gases without contaminating, etching, corroding, diffusion hardening, carbon- or oxygen embrittling or in any other manner altering the component area and surface to be protected. Also, at such elevated temperatures, components of the protective arrangement may chemically react to alter the protected component surface, which again gives rise to problems. Additionally, particles of the first layer of the protective arrangement may bond with the component by sintering or diffusion.

Conventional protective arrangements, such as shielding jeopardized component areas by powder fills or arranging jeopardized component areas in powder fills outside the reaction chamber have so far proved practicable at negligible scrap rates only for gas diffusion coating below 900° C. In conventional protective arrangements, scrap is produced as a result of creep coating induced by the highly active, greatly reactive and scattering coating atmosphere at elevated temperatures. Also, damage to the protected component surfaces several micrometers deep and varying with time and temperature has been noted.

The present invention aims to provide a generic protective arrangement that overcomes the noted disadvantages and ensures complete protection of the component also when gas diffusion coating at temperatures above 900° C. The present invention also provides a simple low-cost method for manufacturing, depositing and removing the protective arrangement.

It is a particular object of the present invention to provide an arrangement in which the first layer is a slip cast layer composed of oxide ceramic particles carried in a low-carbon vehicle free from halide, while the second layer is a metal layer or a metallic slip cast layer, where the metal layer exhibits at least 50% by weight of the base metal fraction of the component and contains all major alloy constituents of the component.

This protective arrangement provides an advantage in that it ensures full protection for the component area to be protected from aluminizing and chromizing during vapor-phase deposition also at process temperatures above 900° C. Suitable matching of the material composition of the gettering and sealing metal layer, which is entirely free of oxide ceramic constituents, consists at least 50% by weight of the component's base metal and contains all major alloy constituents of the component, provides a further advantage in that this metal layer exhibits neither diffusion effects nor chemical reactions with the component material to be protected in the surface zones of the masking protective arrangement, especially so when the metal layer is chemically identical with the component material. The metal layer in the inventive composition protects the material of the component from aluminizing or chromizing by absorbing the elements (Al or Cr) and metal halides presented in the vapor phase, while on account of its metallic composition it will not alter the surface zone of the protected component area. Another advantage is provided in that the component surface is not depleted of elements easily removed by diffusion, such as aluminum, titanium or chrome, considering that in accordance with this invention, these are presented in sufficient concentration by the metal layer.

In a preferred aspect of the present invention the protective arrangement will not cover the component in its entirety, but only selectively, so that the surface areas of the component to be aluminized or chromized are fully exposed to the reaction gases.

To still improve on the action of the protective arrangement, the arrangement preferably exhibits several layers reacting with the coating atmosphere. These layers have metal particles of varying compositions, where the metal layer that in terms of composition corresponds most to the component alloy is preferably arranged closest to the component surface. The metal layer which on account of its composition or porosity has a pronounced gettering effect on the reaction gases is used as the central layer, while the outer layer is a maximally gastight layer, preferably metal foil or metal sheet masking.

In a further preferred aspect of the present invention the metal layer is arranged as a conformal metal foil or conformal metal sheet on the interlayer. Conformation to contour is here achieved either by pressing the metal foil onto the interlayer or by subsequently filling the space between the metal sheet and the first layer with metal slip. This aspect of the present invention provides an advantage in that the metal layer can be given an extremely effective gas sealing effect relative to the reaction space.

An additional contour-hugging masking sheet can be used to seal the metal layer preferably relative to the reaction space. A masking sheet of this description adds to the soundness of the protective arrangement and simultaneously facilitates the manipulation of the components when preparing for and performing the gas diffusion process. The masking sheet is here designed to split preferably along the molding base. In this manner the sheet is advantageously removable in halves from the component following the gas diffusion coating.

In a particularly preferred aspect of the present invention the base metal fraction in the metal layer does not deviate by more than 20% by weight from the base metal fraction of the component. This restriction advantageously ensures that in terms of material composition, the metal layer and the component are more precisely matched to one another and that diffusion voids or such other lattice defects as may otherwise arise in the presence of differing work functions in the rim areas between the metal layer and the component are avoided.

The fraction of chrome content in the metal layer should deviate from a potential chrome fraction of the component by not more than 20% by weight to avoid defects in the component surface. Similarly, the fraction of a Mo, Co or W content in the metal layer should vary from a potential Mo, Co or W content of the component by not more than 10% by weight, while the fraction of an Al or Ti content in the metal layer should vary from a potential Al or Ti content of the component by not more than 5% by weight.

For clean separation of the protective arrangement from the component following vapor-phase diffusion, the interlayer preferably consists of $Al_2O_3$. The thickness of this layer preferably runs between 0.3 mm and 2 mm.

A method for manufacturing a component of an iron, cobalt or nickel-base alloy with a protective arrangement to prevent aluminizing or chromizing during gas diffusion coating with a first layer as an interlayer and a second layer as a getter layer for reaction gases uses the following process steps:

a) Deposit a first slip cast layer composed of oxide ceramic particles carried in a low-carbon vehicle free from halide;

b) Deposit a second layer of metal or metallic slip, where the base metal of the metal layer contains at least 50% by weight of the base metal fraction of the component and the metal layer exhibits all major alloy constituents of the component.

This method provides an advantage in that it is suitable for bulk production, especially so as the slip casting process is a readily manageable technique giving reproducible coating results and thicknesses. For this purpose, a slip casting layer of preferably oxide ceramic particles is deposited by means of a vehicle consisting of polyvinyl alcohol or polyvinyl acetate and water. The metal layer as a gettering layer can be deposited to hug the contour also by plasma spraying, electroplating, painting with inorganic metal paints, vacuum vapor deposition or foil plating.

In a preferred aspect of the inventive process the component is partially fitted into a closely contoured outer sheet which does not react chemically with the component material and which in composition corresponds to the metal layer and then the space in between is fully or partially filled with slip for the first layer, or when the first layer has previously been deposited, with the material for the second layer, and the slip is then dried. This practice has shown that the slip between the closely contoured outer sheet and the component, if deposited simply as a seam like a weld bead, will provide perfect protection. With this process variant a compact assembly of protective coating layers of the protective arrangement and a closely contoured outer sheet for masking can be economically manufactured. The slip cast layer can here consist of oxide ceramic particles (first layer or interlayer) and be deposited preferably by means of a vehicle consisting of polyvinyl alcohol and water.

This protective arrangement is preferably used for protecting components or component areas from aluminizing or chromizing during gas diffusion coating at temperatures above 900° C. and a high surface layer activity greater than 20% by weight Al or Cr for the layer deposited by gas diffusion. It has here been seen that practically perfect identity of the gettering metal layer with the component material alone will reproducibly ensure that the surface of the protected component area remains free from damage.

Other objects, advantages and novel features of the present invention will become apparent from the following detailed description of the invention when considered in conjunction with the accompanying drawings.

BRIEF DESCRIPTION OF THE DRAWINGS

The figures below show surfaces in the masking areas of various protective arrangements.

DETAILED DESCRIPTION OF THE DRAWINGS

Example No. 1

A jet engine turbine blade in Rene 80 is protected in the blade root section, the fir-tree profile of which is not to be aluminized or chromized, by means of a conventional protective arrangement consisting of an interlayer of oxide ceramic powder and a gettering second layer consisting of a metal-metal oxide powder blend such as it can be procured from Alloy Surfaces, Wilmington, USA or Turcochrom, Israel. The protected arrangement is exposed to vapor-phase aluminizing at 1060° C. for a duration of 6 hours, with a high surface aluminum content of 33% by weight aluminum being maintained.

Figure 1:
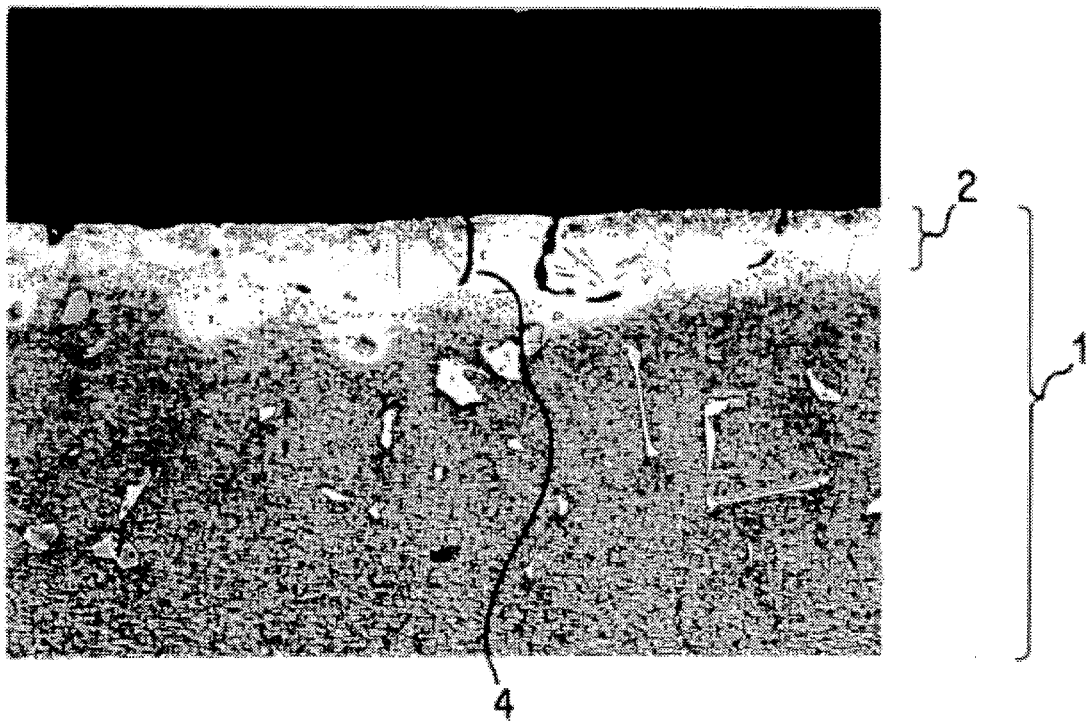
FIGS. 1 and 2 show ground and polished microsections of component areas protected during vapor-phase aluminizing by conventional protective arrangements.
Figure 2:
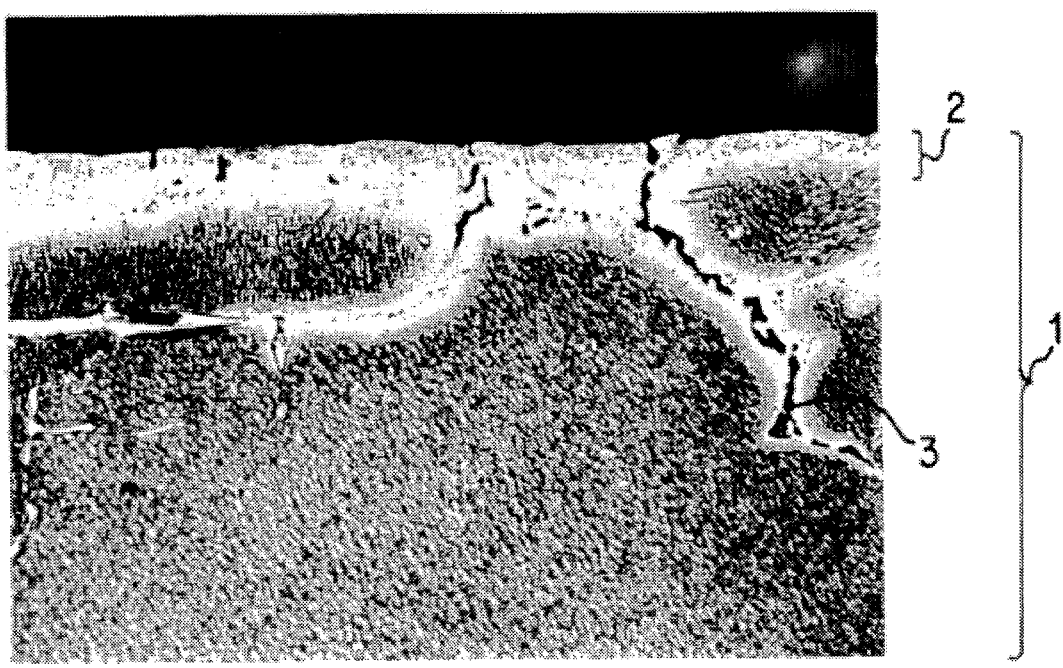

The soundness of protection is illustrated in FIGS. 1 and 2, which at 500× magnification show microsections taken at right angles with the component surface of the protected areas. FIGS. 1 and 2 clearly show crystallites of the base material 1 with segregations of readily diffusible alloy constituents (a dark grey in the microsection) from aluminum, chrome or titanium in the crystal volume. Near-surface areas 2 appear bright in the microsection and no longer show segregations. The readily diffusible alloy constituents have disappeared from these areas as a result of the imperfect protective action of commercially available masking systems. The component surface is depleted of essential alloy constituents.

Example No. 2

A jet engine turbine blade in Rene 80 is masked with the inventive protective arrangement in the blade root area, the fir-tree profile of which is not to be aluminized or chromized. For this purpose, a first layer of an $Al_2O_3$ slip 0.8 mm thick is deposited, the slip consisting of $Al_2O_3$ particles of a mean particle size under 50 μm in a vehicle consisting of polyvinyl alcohol and water. Thereafter, a slip casting layer 1.5 mm thick of metal powder is deposited, the metal powder consisting at least 50% by weight of the base metal of the component and containing all major alloy constituents. In this example the metal particles contain 15% Cr, 4% Al, 3.5% Ti, 4% Mo, 15% Co, all by weight, the remainder being Ni. The slip here contains a vehicle consisting of polyvinyl alcohol and water. The protective arrangement is finally masked with an outer metal sheet 0.5 mm thick in a Fe-base alloy. The protective arrangement is exposed to vapor-phase aluminizing at 1060° C. for a duration of 6 hours, where a high surface aluminum content of 33% by weight aluminum is maintained.

Figure 3:
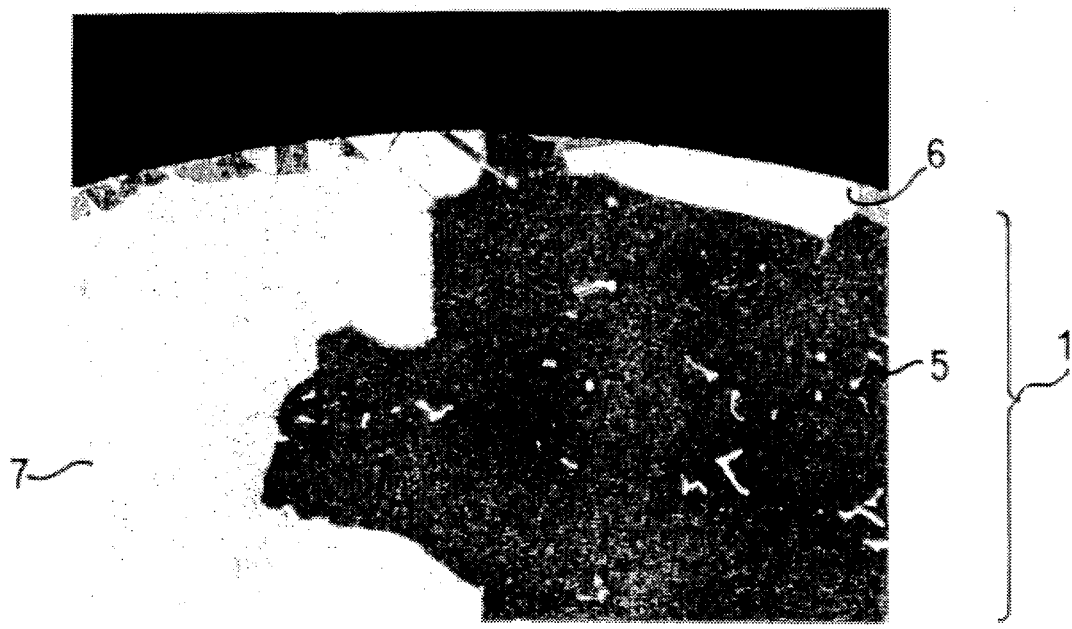
FIGS. 3 and 4 show ground and polished microsections of component areas protected during vapor-phase aluminizing by inventive protective arrangements.
Figure 4:
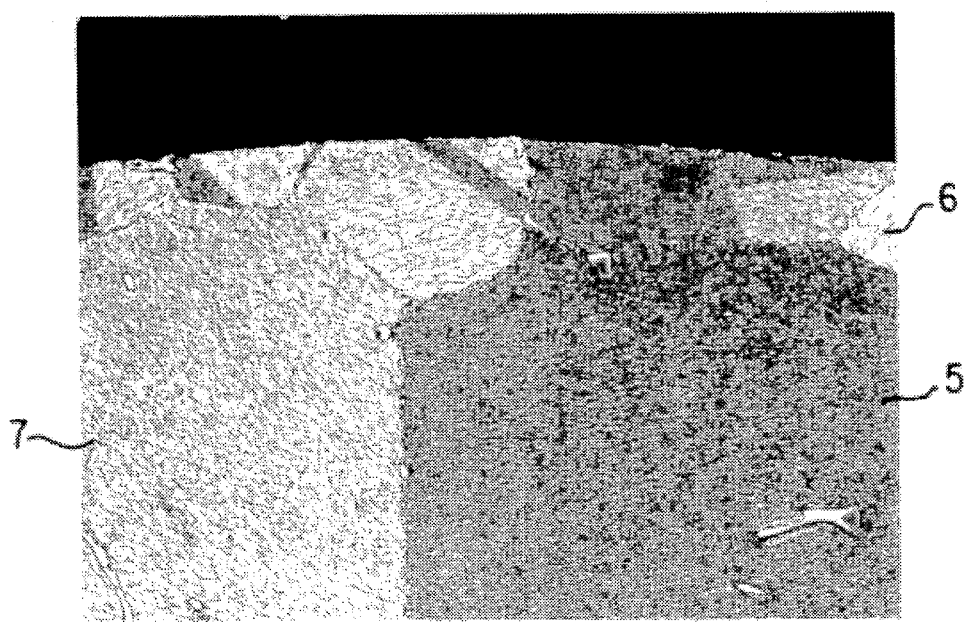

The effectiveness of protection is illustrated by FIGS. 3 and 4, which show microsections at 200× and 500× magnification, respectively, taken at right angles with the component surface of the protected areas. Crystallites 5, 6, 7 with sharply contrasted grain boundaries 3 are apparent in base material 1. No zone of removal by diffusion is obvious at the grain boundaries or in the near-surface area. No cracks are apparent in the surface even under 500× magnification (FIG. 4).

Example No. 3

A jet engine turbine blade in Rene 80 is masked with the inventive protective arrangement in the blade root area, the fir-tree profile of which is to be excepted from aluminizing or chromizing. For this purpose, a first layer of an $Al_2O_3$ slip layer 0.8 mm thick is deposited, where the slip consists of $Al_2O_3$ particles of a mean particle size of under 50 μm in a vehicle of polyvinyl alcohol and water.

Thereafter, a metal layer is deposited, consisting of a conformal powder metallurgically manufactured molding 6 mm to 10 mm thick, where the space between the PM molding and the first slip casting layer is filled with a metal powder slip. The molding is sintered for a protective arrangement of nickel-base alloy (Rene 80) component from a nickel-base metal powder of a mean particle size under 50 μm, with the metal powder of the present example containing 15% Cr, 4% Al, 3.5% Ti, 17% Co, all by weight, the remainder being Ni. The protective arrangement is exposed to vapor-phase aluminizing at 1060° C. for a duration of 6 hours, with a high surface aluminum content of 33% by weight aluminum being maintained.

In terms of surface quality the effectiveness of protection provided by example No. 3 corresponds to that of example No. 2. No surface defects or damage are noted.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A formed article made of an iron, cobalt or nickel-base alloy containing at least one element selected from the group consisting of Mo, Co, W and Ti, and having a protective coating to prevent aluminizing or chromizing during gas diffusion coating at temperatures above 900° C., said coating comprising a first layer used as an interlayer and a second layer as a getter layer for reaction gases, wherein:

the first layer is a slip casting layer which comprises oxide ceramic particles in a low-carbon, halide-free vehicle;

the second layer has at least one metal layer or metallic slip casting layer, where the metal layer contains at least 20% by weight of the article's base metal fraction and contains all major alloy constituents of the article;

the fraction when said article's alloy constituents include Cr, of Cr content in the metal layer varies from Cr fraction in the article by not more than 20% by weight;

the fraction when said article's alloy constituents include Mo, Co or W, of Mo, Co or W content in the metal layer varies from the Mo, Co or W content of the article by not more than 20% by weight; and the fraction when said article's alloy constituents include Al or Ti, of Al or Ti content in the metal layer deviates from the Al or Ti content of the article by not more than 5% by weight.

2. The formed article of claim 1, wherein the protective coating masks the article selectively.

3. The formed article of claim 1, wherein the metal layer arranged on the interlayer is a conformal metal foil or sheet.

4. The formed article of the claim 1, wherein the metal layer is masked by a closely contoured masking sheet.

5. The formed article of claim 4, wherein the masking sheet splits at the molding base.

6. The formed article of claim 1, wherein the interlayer consists of $Al_2O_3$.

* * * * *